April 1, 1958  A. J. BRYANT  2,828,529
METAL WORKING TOOL
Filed Jan. 16, 1952
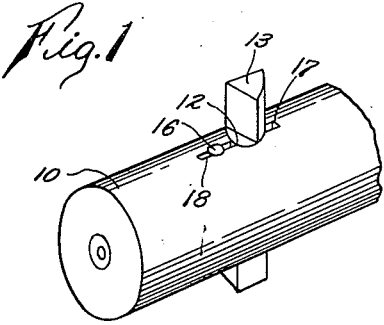
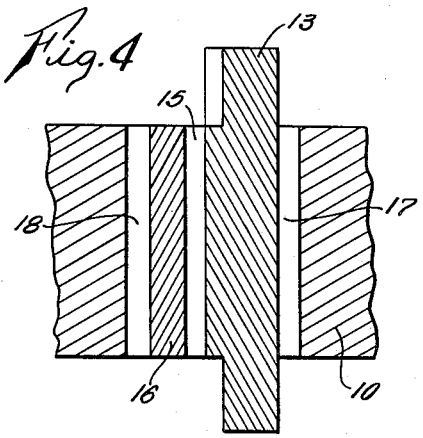
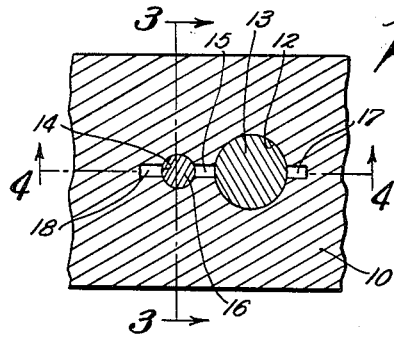
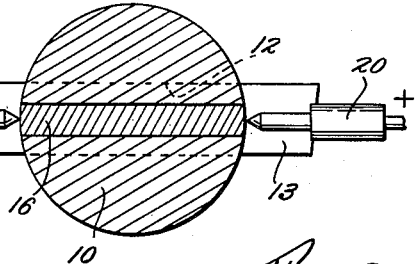
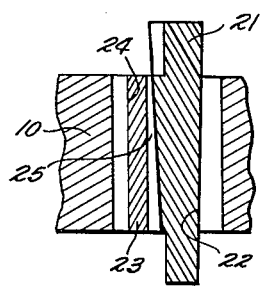
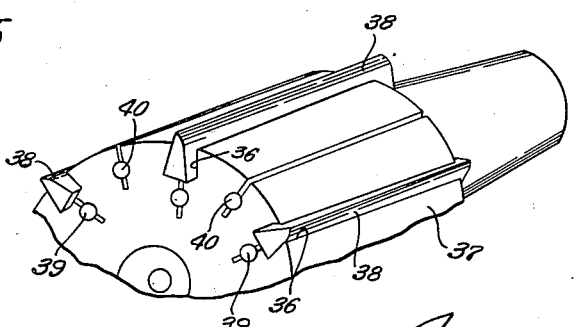
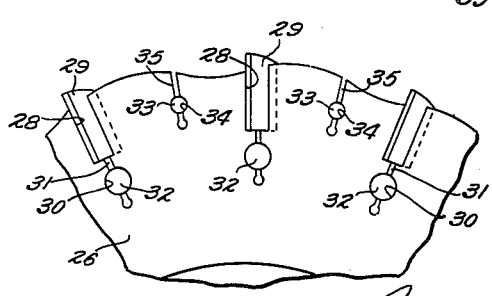
INVENTOR.
Andrew J. Bryant
BY
Murray, Sackhoff & Murray
ATT'YS United States Patent Office 2,828,529
Patented Apr. 1, 1958

2,828,529

METAL WORKING TOOL

Andrew J. Bryant, Cincinnati, Ohio

Application January 16, 1952, Serial No. 266,711

2 Claims. (Cl. 29—96)

The present invention relates to a cutting tool and is particularly directed to a novel and improved means for securing a cutting tip of very hard metal to a metal holder.

My invention is applicable to all kinds of wood or metal working cutting tools that have inserted teeth and comprises the mounting of a tooth or tip element in the socket of a support or holder element whilst both are maintained at substantially room temperatures, by the utilization of the thermodynamic characteristics of an electrically conductive, thermal expansion element embedded in the body of the support element adjacent the tooth receiving socket therein. The invention includes the important features of employing a metal expansion pin having a higher coefficient of expansion and greater electrical conductivity than the metal from which the holder element is fashioned. The invention also has the advantage of maintaining the holder and tip at an assembly temperature far below the critical drawing and tempering ranges of the tool metals, thereby precluding the possibilty of exceeding the elastic limits of the metal parts, the objectionable permanent set of the parts, or the undue hardening of the tool shank during tool assembly.

The practice of my invention requires small installation space in the support element of a cutting tool and has particular utility in the production of small boring bars, or the like, wherein the cross sectional area of the bar stock is quite limited and the usual tip clamp arrangements materially reduce the strength and durability of the bars to such an extent that they are incapable of withstanding the operating stresses required of them for any appreciable time without breakage.

The preferred manner of practicing my invention and the novel cutting tool produced thereby is disclosed in the following specification, reference being had to the accompanying drawing which is illustrative of my product..

In the drawing:

Fig. 1 is a fragmental, perspective view showing a tool produced in accordance with my invention.

Fig. 2 is an enlarged section taken horizontally through the longitudinal center of the tool shown in Fig. 1.

Fig. 3 is a section taken on line 3—3 of Fig. 2.

Fig. 4 is a section taken on line 4—4 of Fig. 2.

Fig. 5 is a view similar to Fig. 4 showing a modification of my tool.

Fig. 6 is a fragmental, side elevational view of a periphery cutting saw or edger produced by my invention.

Fig. 7 is a perspective view depicting a part of a reamer made by my invention.

With particular reference to Figs. 1–4 of the drawing the reference numeral 10 indicates a holder for a metal working tool which takes the form of a boring bar, said bar having a tip receiving recess 12 drilled therethrough for joining a cutter 13 to it. The bar is made of a good grade carbon steel in general use as machine tool stock. A through bore 14 is formed in the bar adjacent the recess 12, said bore 14 being parallel to, and coextensive with, the said recess. The bore 14 communicates with the recess along its entire extent by the formation of a cut-away portion or slot 15 in the body of the shank which serve as a relief for the body of the bar when it is being expanded by an electrically conductive, thermally expansive pin 16 preferably made of brass. The pin is tightly fitted in the bore 14 to preclude its axial displacement from the holder during tool use and is of a length to be coextensive with the tip receiving recess 12. As best shown in Figs. 2 and 4 additional relief slots 17 and 18 may be formed in the boring bar on the opposite sides of the recess 12 and the bore 14 respectively.

In practicing my invention the contour of the tip receiving recess 12 is undersize with respect to the contour of the tip, the recess 12 being formed on a diameter slightly less than the diameter of the tip 13 taken when both parts are at normal room temperature. The pin 16 is also snugly fitted in the bore 14 when the parts are at room temperatures. To secure the tip 13 in the bar 10 it is only necessary to apply the electrodes 19 and 20 of a high or medium frequency generator or converter to the opposite exposed ends of the embedded pin 16 and then pass an electric current therethrough. This electric current quickly heats the pin 16 causing it to expand and said expansion forces apart the portions of the boring bar disposed on opposite sides of the recess 12, thus increasing the diameter of the recess sufficiently for it to receive the tip 13. With the tip held in its operative position in the recess in the bar, the passage of the current through the pin is discontinued by the removal of the electrodes 19 and 20 from contact with the pin, whereupon the pin cools and contracts permitting the body of the tool to return toward its original set position which in turn contracts the recess so that it clamps the slightly oversize tool bit 13 to the holder. The ends of the carbide tip may then be ground for the particular work for which the boring bar is to be adapted.

It will therefore be noted that the coefficient of expansion and the electric conductivity of the expansion pin 16 is higher than the identical characteristics of the material from which the holder is constructed. Thus the electric current applied to the expansion pin by the electrodes 19 and 20 passes directly through the pin and heats said pin permitting its quick expansion and the expansion of the tip receiving recess in the holder before an objectionable amount of said heat is conducted to the body of the holder.

In Fig. 5 there is shown a modified form of cutter bar wherein a tapered tip 21 is secured in a tapered tip receiving recess 22 formed through the bar. An electrically conductive, thermally expansive pin 23 is fitted in a bore 24 formed in the bar in a position coextensive with, and parallel to, the recess. The pin is brazed to the bar and disposed at 25 adjacent the tip along a tangential opening between the recess 22 and the bore 24.

My invention is applicable to the manufacture of many other kinds of small tools including the periphery cutting saw or edger shown in Fig. 6, or the reamer shown in Fig. 7. With reference to Fig. 6 the periphery 26 of the saw body 27 is provided with a number of radially disposed, angularly spaced recesses 28. The recesses are wedge shaped in lateral section and are adapted to receive similarly shaped cutting tips 29. Positioned inwardly from the bottoms of the recesses are pin receiving bores 30 which are connected to the recesses by short passageways 31, said bores being fitted with electrically conductive, thermally expansive pins 32. Disposed between adjacent tip receiving recesses are counter-thermal expansion pins 33 embedded in bores 34 formed through the saw body. These bores communicate with the peripheral face of the saw by short relief slots 35.

As in the devices shown in Figs. 1–5 the cross sectional area of the cutting tips of the tool in Fig. 6 are slightly oversize with respect to the cross sectional area of the tip receiving recesses 28 when the saw body and the tips are at normal room temperatures. After the expansion pins 32 have been fitted in their respective bores 30 each is expanded by passing a high or medium frequency electric current therethrough, each expansion of a pin forcing apart the portions of the saw body on each side of its respective recess 28 to expand it for the reception of the oversize tip 29. When the tip is in its operative position the passage of the current is discontinued whereby the pin contracts permitting the return of the saw body toward its normal position to secure the tip in the saw body. The heat generated by the tool during its operation may cause undue expansion of the saw body by the pins 30 thereby rendering more or less ineffective the clamping action of the saw body on the tips. To counteract any tendency of the tips to become loose in their recesses during saw operation counter-expansion pins 33 are embedded in the saw body between the tips and any heat generated by the teeth during operation will cause said pins to expand and force the sides of the recesses together to hold the teeth in their respective recesses against the expansive forces set up by the pins 30 which are relatively more remote from the source of heat than the pins 33.

The cutting reamer shown in Fig. 7 is quite similar to the saw just described except that the tip receiving recesses 36 are wedge shaped and have their axes lying parallel to the rotating axis of the reamer head 37 instead of being normal to the axis of the saw construction. Wedge shaped cutting tips 38 are slightly oversize in lateral section relative to the sectional area of the recesses, said tips being inserted axially into the slots when the head portions on opposite sides of the recesses are held in expanded position by the electrically conductive, thermally expansive pins 37. Upon cooling of the said pins the head portions contract thus securing the tips in their respective recesses. The counter-thermal expansion pins 40 embedded in the tool head between adjacent tips precludes their becoming loose due to the heat generated by operation of the reamer.

It will therefore be understood that the heating of the electrically conductive, thermally expansive pins creates an outwardly directed, internally located force which forces apart those portions of the holder body located on opposite sides of the tip receiving recess in the body, which enlarges the recess contour to an extent sufficient for its reception of the normally oversize tip. It is contemplated that the contour differential between the recess and the tip should not be more than a few thousands of an inch to insure that the extent of tool body expansion never be great enough to exceed the elastic limit of the tool steel of the holder body. It will be further noted that the heat generated by the high frequency current in the expansion pin is largely localized in the pin body and only a small quantity of such heat is conducted to the holder body thus maintaining the holder and tip at a temperature well below their critical drawing or tempering temperatures.

What is claimed is:

1. In a metal working tool the combination of a holder body having a normally undersized recess formed therein, a tool tip held in the recess, said tip having an oversized contour with respect to the contour of the said recess, a bore formed in the holder body adjacent the recess and coextensive therewith, a slot formed in the holder body and connecting the bore and the recess, and an electrically conductive, thermally expansive pin fitted within the bore and having a coefficient of expansion that is higher than the holder body.

2. In a metal working tool, the combination of a holder body having a tip receiving recess formed therethrough, a tip in the recess, said tip having a normally oversized contour with respect to the normal contour of the said recess, a through-bore formed in the holder body adjacent the recess and disposed in parallelism therewith, a slot formed in the holder body and connecting the recess and the bore along their entire extents, and a thermally expansive pin fitted within the bore and having a higher coefficient of expansion than the holder body.

References Cited in the file of this patent

UNITED STATES PATENTS

| | | |
|---|---|---|
| 72,447 | Brown | Dec. 24, 1867 |
| 628,530 | Gozzard | July 11, 1899 |
| 990,068 | Searles | Apr. 18, 1911 |
| 1,187,393 | Solmon | June 13, 1916 |
| 1,223,654 | Allingham | Apr. 24, 1917 |
| 1,733,594 | Greer et al. | Oct. 29, 1929 |
| 1,855,971 | Kilmer | Apr. 26, 1932 |
| 2,130,684 | Hintermeyer | Sept. 20, 1938 |
| 2,508,183 | Mitchell | May 16, 1950 |